United States Patent
Tsai et al.

(10) Patent No.: US 10,090,756 B1
(45) Date of Patent: Oct. 2, 2018

(54) SINGLE INPUT MULTI OUTPUT DIRECT CURRENT POWER SUPPLY SYSTEM AND CONTROL CIRCUIT THEREOF

(71) Applicant: Wistron Corporation, New Taipei (TW)

(72) Inventors: Meng-Ru Tsai, New Taipei (TW); Tung-Ling Tsai, New Taipei (TW)

(73) Assignee: Winstron Corporation, New Taipei (TW)

( * ) Notice: Subject to any disclaimer, the term of this patent is extended or adjusted under 35 U.S.C. 154(b) by 0 days.

(21) Appl. No.: 15/942,563

(22) Filed: Apr. 1, 2018

(30) Foreign Application Priority Data

Nov. 24, 2017  (TW) .............................. 106140873 A

(51) Int. Cl.
| | |
|---|---|
| *H02M 1/36* | (2007.01) |
| *H02M 3/157* | (2006.01) |
| *H02M 3/158* | (2006.01) |
| *H02M 1/32* | (2007.01) |
| *H02M 1/14* | (2006.01) |
| *G05F 1/577* | (2006.01) |
| *H02M 1/00* | (2006.01) |

(52) U.S. Cl.
CPC ............... *H02M 1/36* (2013.01); *H02M 1/14* (2013.01); *H02M 1/32* (2013.01); *H02M 3/157* (2013.01); *H02M 3/1584* (2013.01); *H02M 2001/009* (2013.01)

(58) Field of Classification Search
CPC .......... H02M 1/36; H02M 3/157; H02M 3/15; H02M 3/1584; H02M 3/1588; H02M 2001/008; H02M 2001/009; G05F 1/577
USPC ......................................................... 323/267
See application file for complete search history.

(56) References Cited

U.S. PATENT DOCUMENTS

| | | | | |
|---|---|---|---|---|
| 5,185,567 A | * | 2/1993 | Uchida | .................... G05F 1/577 307/19 |
| 6,771,052 B2 | * | 8/2004 | Ostojic | .................... H02J 1/08 323/266 |
| 7,847,532 B2 | * | 12/2010 | Potter | ....................... G06F 1/26 307/18 |
| 9,312,766 B2 | * | 4/2016 | Labib | .................... H02M 3/158 |

* cited by examiner

Primary Examiner — Gary L Laxton
(74) Attorney, Agent, or Firm — Winston Hsu

(57) ABSTRACT

A buck voltage regulator control circuit for a single-input multi-output direct current power supply system, during a soft start phase of a first buck voltage regulator of the power supply system, the buck voltage regulator control circuit controls a first high side switch of the first buck voltage regulator to switch to a turned-on state from a turned-off state when a second high side switch of a second buck voltage regulator is in the turned-off state. Therefore, the first and second high side switches are not simultaneously switched to the turned-on state from the turned-off state to reduce inrush current.

18 Claims, 4 Drawing Sheets

SINGLE INPUT MULTI OUTPUT DIRECT CURRENT POWER SUPPLY SYSTEM AND CONTROL CIRCUIT THEREOF

BACKGROUND OF THE INVENTION

1. Field of the Invention

The present disclosure relates to a single-input multi-output direct current power supply system and related buck voltage regulator control circuit, and more particularly to a single-input multi-output direct current power supply system and related buck voltage regulator control circuit capable of reducing inrush current during startup as well as ripple voltage.

2. Description of the Prior Art

Single-input multi-output direct current power supply system is widely used on electronic systems, such a laptop computer, a desktop computer, a server system and the like, which takes a higher direct current voltage as an input source, and converts it into multiple output voltage sources by a multiple Pulse Width Modulation (PWM) buck voltage regulators to supply power to system elements. For example, a power supply unit (PSU) or a battery pack may convert single alternating current power into a direct current voltage source with a higher voltage level, and down convert it into multiple direct current voltage sources with lower levels by multiple buck voltage regulators.

FIG. 1 is a functional block diagram of a buck voltage regulator 1 of the prior art. The buck voltage regulator 1 includes a PWM controller 10, a gate driver circuit 11, a high side switch HSW (e.g., a Metal-Oxide-Semiconductor Field-Effect Transistor (MOSFET)), a low side switch LSW, an output inductor L, and an output capacitor C. The PWM controller 10 is configured to generate a PWM signal PWM to the gate driver circuit 11 according to a voltage enable signal V_EN. A combination of the gate driver circuit 11, the high side switch HSW, the low side switch LSW, the output inductor L and the output capacitor is configured to convert an input direct current voltage V_IN into an output direct current voltage V_OUT according to the PWM signal PWM. Operations regarding voltage conversion are well known in the art, which is omitted.

When buck voltage regulator 1 is at a turned-off state, an initial voltage of the output capacitor C is zero volt. When buck voltage regulator 1 is at a startup state and the PWM signal PWM is at a high level, the high side switch HSW may be turned on to allow a direct current I corresponding to the input direct current voltage V_IN flow through the high side switch HSW and the output inductor L to charge the output capacitor C. When high side switch HSW is turned on, a stored voltage level of the output capacitor C (i.e., the output direct current voltage V_OUT) gradually rises from zero volt, wherein an instantaneous charge current I of the output capacitor C is represented by C*(dV_OUT)/(dT), T is a charge time. At the moment when the buck voltage regulator 1 just starts up, the output direct current voltage V_OUT is initially at the zero volt, the charge voltage per unit time dV_OUT/dT is close to a maximum value (dV_OUT almost equals to the input direct current voltage V_IN, and the unit charge time dT almost equals to zero), and thus the instantaneous charge current I of the output capacitor C is close to the maximum value. As the output direct current voltage V_OUT gradually increases, the charge current I gradually decreases.

An inrush current refers to a maximum current that is instantaneously generated when the input direct current voltage with a higher level starts to charge an equivalent capacitor of the direct current power supply system. When a designer tends to constrain a ripple voltage of a voltage source in the direct current power supply system within an acceptable range, it is common to increase an output capacitance of voltage source (e.g., the capacitance of the output capacitor C of the buck voltage regulator 1) to reduce the ripple voltage. However, increasing the output capacitance leads to an increase to the equivalent capacitance of the direct current power supply system, wherein the equivalent capacitance of the direct current power supply system is a sum of output capacitances of every buck voltage regulators. The greater equivalent capacitance of the direct current power supply system, the greater inrush current, in particular when all the buck voltage regulators of the direct current power supply system are simultaneously turned on, the instant output current of the power supply unit or the input battery pack may be greater than a rated maximum current provided by the direct current power supply system. Given that the direct current power supply system includes N buck voltage regulators, when N high side switches HSW of the N buck voltage regulators are simultaneously turned on, the inrush current of direct current power supply system is represented as a sum of charge currents of output capacitors C1, C2, . . . , Cn, I_inrush=I1+ . . . +In=C1*(dV_OUT1)/(dT)+ . . . +Cn*(dV_OUTn)/(dT). In such a situation, the inrush current I_inrush may trigger an overcurrent protection (OCP) circuit of the direct current power supply system to force to turn off the direct current power supply system.

To solve the issue above mentioned, the designer tends to increase the rated maximum current and a trigger level of the OCP provided by the direct current power supply system, but causes extra cost to the direct current power supply system. For example, electronic elements adaptive to the higher rated maximum current are expensive. In practice, the inrush current usually shows in an initial startup phase of the buck voltage regulator, a probability of showing the inrush current is low after the output voltage has reached to a steady state. However, the direct current power supply system suffers over design and increased cost due to the over inrush current in the initial startup phase. In addition, the rated maximum current and the trigger level of the OCP may be too high to protect the direct current power supply system, e.g., a risk of damaging the output load by the over current increases as the trigger level of the OCP increases.

In addition, another solution is to decrease an output capacitance corresponding to each of the buck voltage regulator to decrease the overall equivalent capacitance of the direct current power supply system, but the output voltage of the buck voltage regulator suffers a higher ripple voltage to influence the operation of the output load. For example, when the ripple voltage is too high, the output load (e.g., the computer system) may become abnormal due to voltage swings of the ripple voltage. Therefore, decreasing the output capacitance corresponding to each of the buck voltage regulator cannot ensure a design margin of the direct current power supply system.

Therefore, there is a need to provide a single-input multi-output direct current power supply system capable of mitigating the inrush current during startup as well as ripple voltage of the buck voltage regulator.

SUMMARY OF THE INVENTION

It is therefore an objective of the present disclosure to provide a single-input multi-output direct current power supply system and related control circuit capable of mitigating the inrush current during startup as well as ripple voltage of the buck voltage regulator.

The present disclosure discloses a single-input multi-output direct current (DC) power supply system configured to convert a DC input voltage into a plurality of DC output voltages, and includes a buck regulator module and a buck regulator control module. The buck regulator module includes a first buck voltage regulator and a second buck voltage regulator, wherein the first buck voltage regulator is configured to generate a first PWM signal according to a first voltage enable signal, and convert the DC input voltage into a first DC output voltage according to the first PWM signal and a first modulated enable signal. The buck regulator control module is coupled to the buck regulator module includes a first buck voltage regulator control circuit coupled to the first buck voltage regulator and the second buck voltage regulator, and configured to generate the first modulated enable signal to the first buck voltage regulator according to the first voltage enable signal, the first PWM signal, a first power good signal generated by the first buck voltage regulator, and a second PWM signal generated by the second buck voltage regulator; wherein during a soft start phase of the first buck voltage regulator and when the second PWM signal is at a low level, the buck voltage regulator control circuit controls a first high side switch of the first buck voltage regulator to switch to a turned-on state from a turned-off state and a second high side switch of a second buck voltage regulator to stay in the turned-off state.

The present disclosure further discloses a first buck voltage regulator control circuit for a single-input multi-output DC power supply system, and includes a switch and a logic circuit. The switch is coupled to a first buck voltage regulator of the single-input multi-output DC power supply system, and configured to connect a first PWM controller of the first buck voltage regulator and a gate driver circuit or disconnect the first PWM controller of the first buck voltage regulator from the gate driver circuit according to a first modulated enable signal. The logic circuit is coupled to the switch and the first buck voltage regulator, and configured to generate the first modulated enable signal to the switch according to a first voltage enable signal, a first PWM signal generated by the first PWM controller, a first power good signal generated by the first PWM controller and a second PWM signal generated by a second buck voltage regulator of the single-input multi-output DC power supply system; wherein during a soft start phase of the first buck voltage regulator and when the second PWM signal is at a low level, the buck voltage regulator control circuit controls a first high side switch of the first buck voltage regulator to switch to a turned-on state from a turned-off state and a second high side switch of a second buck voltage regulator to stay in the turned-off state.

To sum up, when the direct current power supply system is in the soft start phase, the present disclosure avoids all the high side switches of the direct current power supply system from simultaneously being turned on by controlling the enable sequence of the PWM signals of each of buck voltage regulators to avoid the over inrush current. For the direct current power supply system, since the inrush current is effectively constrained, there is no need to increase the rated maximum current and the trigger level of the over current protection provided by the direct current power supply system. Likewise, there is no need to reduce output capacitances of the buck voltage regulators for reducing the inrush current to ensure a ripple voltage of an output voltage is suppressed within a rated peak-to-peak voltage range and a stability of an output load (e.g., a computer system).

These and other objectives of the present invention will no doubt become obvious to those of ordinary skill in the art after reading the following detailed description of the preferred embodiment that is illustrated in the various figures and drawings.

DETAILED DESCRIPTION

The present disclosure aims at avoiding high side switches (e.g., Metal-Oxide-Semiconductor Field-Effect Transistor) of buck voltage regulators from being turned on at the same time when a direct current power supply system is at a soft start phase, which avoids output equivalent capacitors of the buck voltage regulators from summed together to cause an over inrush current. In detail, the present disclosure controls a voltage output sequence of Pulse Width Modulation (PWM) signals of the buck voltage regulators to avoid high side switches of the direct current power supply system from turned on at the same time, so as to avoid the over inrush current. For the direct current power supply system, since the inrush current is effectively suppressed, there is no need to increase a rated maximum current and a trigger level of overcurrent protection provided by the direct current power supply system. Likewise, there is no need to reduce output capacitances of the buck voltage regulators for reducing the inrush current to ensure a ripple voltage of an output voltage is suppressed within a rated peak-to-peak voltage range and a stability of an output load (e.g., a computer system).

Figure 2:
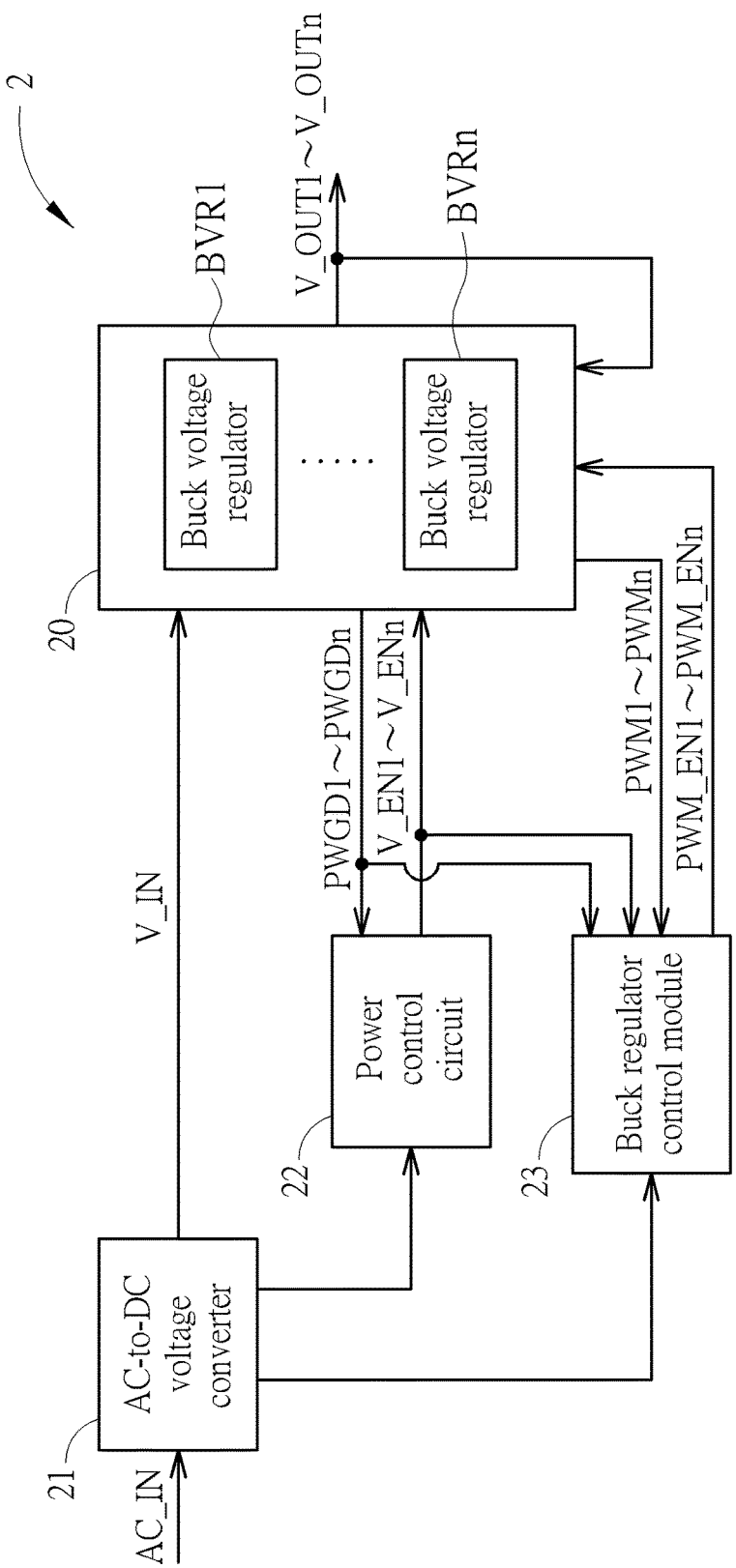
FIG. 2 is a functional block diagram of direct current power supply system according to an embodiment of the present invention.

FIG. 2 is a functional block diagram of direct current power supply system. 2 according to an embodiment of the present disclosure. The direct current power supply system 2 includes a buck regulator module 20, an AC-to-DC voltage converter 21, a power control circuit 22, and a buck regulator control module 23.

The AC-to-DC voltage converter 21 is coupled to the buck regulator module 20, the power control circuit 22 and the buck regulator control module 23, and configured to convert an alternating current voltage AC_IN into a direct current input voltage V_IN to the buck regulator module 20. In addition, the AC-to-DC voltage converter 21 is configured to respectively provide driving voltages to the buck regulator module 20, the power control circuit 22 and the buck regulator control module 23.

The power control circuit 22 is coupled to the buck regulator module 20, the AC-to-DC voltage converter 21 and the buck regulator control module 23, and configured to generate voltage enable signals V_EN1-V_ENn to the buck regulator module 20 and the buck regulator control module 23, and receive power good signals PWGD1-PWGDn from the buck regulator module 20.

Figure 1:
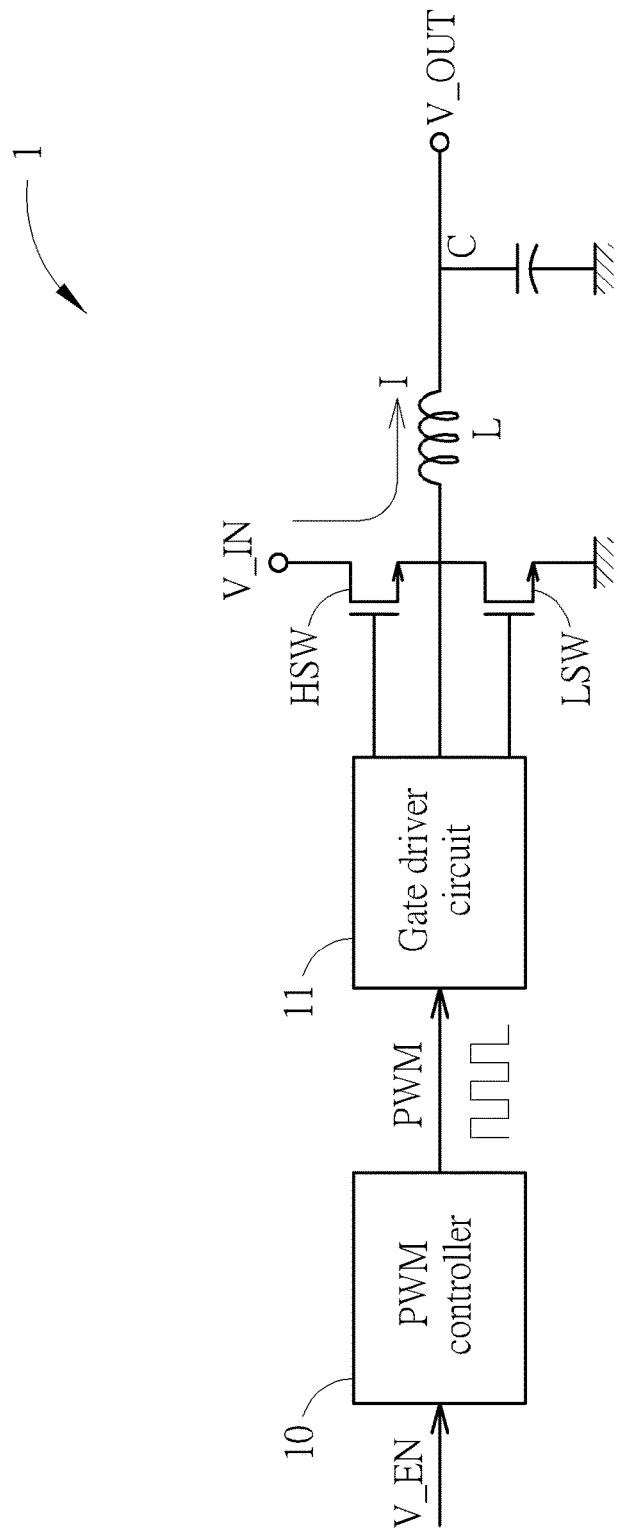
FIG. 1 is a functional block diagram of a buck voltage regulator of the prior art.

The buck regulator module 20 includes buck voltage regulators BVR1-BVRn, wherein a circuit structure of the buck voltage regulators BVR1-BVRn is the same as that of the buck voltage regulator 1 in FIG. 1. The buck regulator module 20 is coupled to the AC-to-DC voltage converter 21, the power control circuit 22 and the buck regulator control module 23, and configured to respectively convert the direct current input voltage V_IN into direct current output voltages V_OUT1-V_OUTn according to the voltage enable signals V_EN1-V_ENn and the modulated enable signals PWM_EN1-PWM_ENn. After the buck regulator module 20 orderly converted the direct current output voltages V_OUT1-V_OUTn, the buck regulator module 20 respectively generates the power good signals PWGD1-PWGDn to the power control circuit 22 and the buck regulator control module 23 to notify voltage conversion is completed.

The buck regulator control module 23 is coupled to the buck regulator module 20, the AC-to-DC voltage converter 21 and the power control circuit 22, and configured to generate the modulated enable signals PWM_EN1-PWM_ENn to the buck regulator module 20 according to the voltage enable signals V_EN1-V_ENn, the PWM signals PWM1-PWMn, the power good signals PWGD1-PWGDn to control the buck voltage regulator BVR1-BVRn orderly to startup to convert the direct current output voltages V_OUT1-V_OUTn.

The modulated enable signals PWM_EN1-PWM_ENn are configured to respectively control an turned-on sequence of the buck voltage regulators BVR1-BVRn, e.g., a soft start phase, to avoid all the high side switches HSW1-HSWn buck voltage regulators BVR1-BVRn from turned on simultaneously, so as to avoid the inrush current due to the output capacitors C1-Cn (not shown in FIG. 2) of the buck voltage regulator BVR1-BVRn summed together simultaneously.

Specifically, during the soft start phase of one of the buck voltage regulators BVR1-BVRn, when all the output capacitors C1-Cn of the buck voltage regulator BVR1-BVRn are initialized with zero volt (i.e., each of the direct current output voltages V_OUT1-V_OUTn is zero volt), the modulated enable signals PWM_EN1-PWM_ENn may control only one PWM signal PWMx corresponding to one buck voltage regulator BVRx at a high level to only turn on the high side switch HSWx to charge its output capacitor Cx. Until the PWM signal PWMx has turned to a low level from the high level, another buck voltage regulator BVRy is allowed to output its PWM signal PWMy to the high level from the low level, so as to turn on a high side switch HSWy of the buck voltage regulator BVRy to charge its output capacitor Cy.

In other words, since the modulated enable signals PWM_EN1-PWM_ENn control only one PWM signal PWMx of the buck voltage regulator BVRx to be the high level, one of the high side switches HSW1-HSWn of the buck voltage regulators BVR1-BVRn (i.e., the high side switch HSWx) is switched from the turned-off state to the turned-on state, and the rest of the high side switches HSW1-HSW(x−1), HSW(x+1)-HSWn stay in the turned-off state. Therefore, the equivalent capacitance of the direct current power supply system 2 equals the output capacitance Cx of the buck voltage regulator BVRx, which effectively reduces the equivalent capacitance of the low direct current power supply system 2. The output capacitance Cx has a rated value that makes the ripple voltage of the output voltage V_OUTx constrained within an acceptable range to ensure the operation of the output load of the direct current power supply system 2.

Noticeably, the buck regulator module 20 is further configured to generate the PWM signals PWM1-PWMn according to the voltage enable signals V_EN1-V_ENn, and the buck regulator control module 23 takes the PWM signals PWM1-PWMn as references to generate the modulated enable signals PWM_EN1-PWM_ENn. In detail, the buck regulator control module 23 knows whether the high side switches HSW1-HSWn of the buck voltage regulators BVR1-BVRn have been turned on according to the PWM signals PWM1-PWMn. For example, during the soft start phase, when the PWM signal PWMx is at the high level, the buck voltage regulator BVRx turns on the high side switch HSWx; on the other hand, when the PWM signal PWMx is at the low level, the buck voltage regulator BVRx does no turn on the high side switch HSWx. In addition, during a startup phase or a steady state, the buck voltage regulator BVRx performs voltage conversion.

As a result, the buck regulator control module 23 utilizes the modulated enable signals PWM_EN1-PWM_ENn to control the turned-on sequence of the high side switches HSW1-HSWn of the buck voltage regulators BVR1-BVRn, which avoid the inrush current due to the high side switches HSW1-HSWn of the buck voltage regulator BVR1-BVRn simultaneously turning on, and ensures that the ripple voltage is constrained within the acceptable range to ensure the operation of the output load of the direct current power supply system 2.

Figure 3:
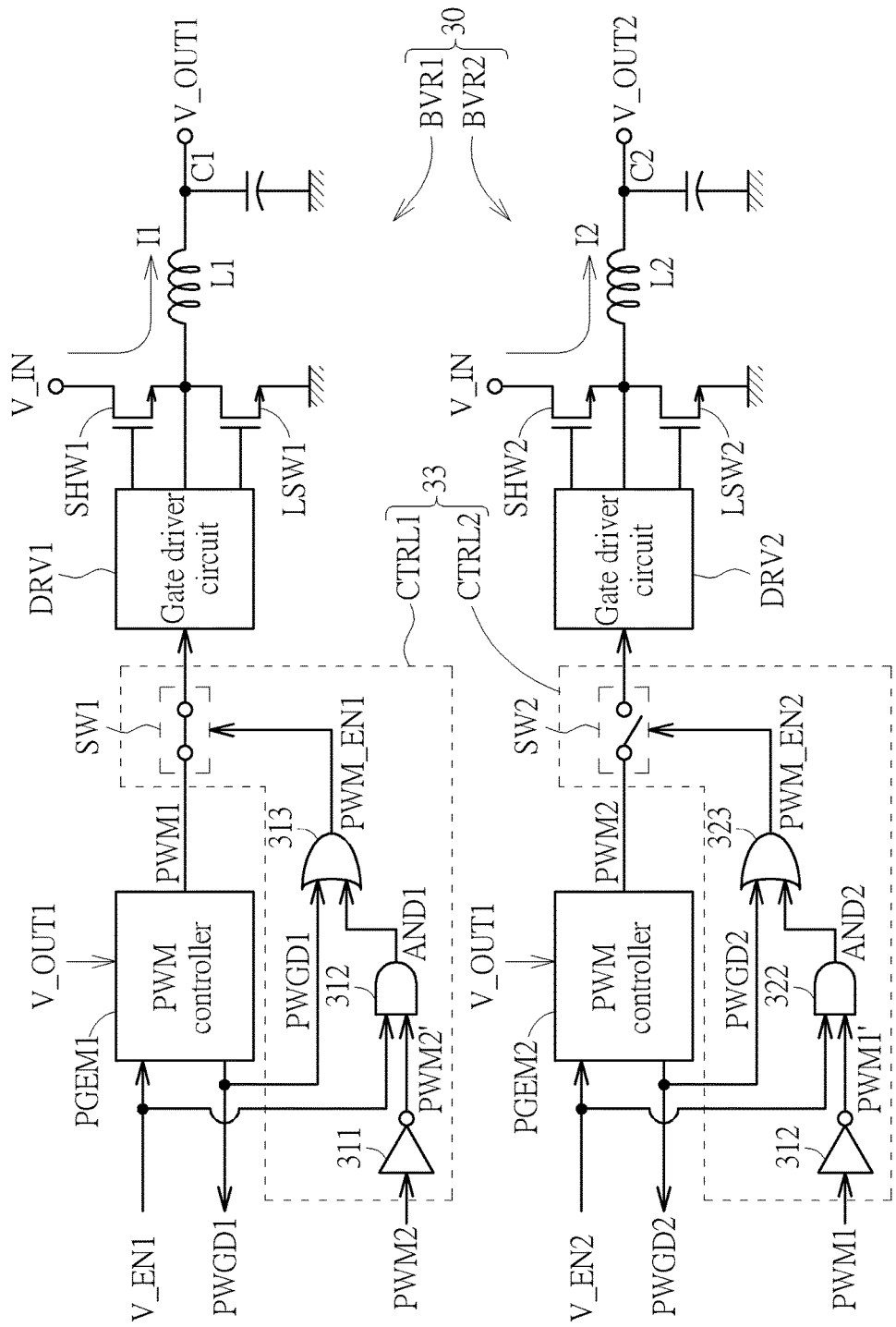
FIG. 3 is a circuit diagram of a gate driver circuit and a buck regulator control module of a buck regulator module according to an embodiment of the present invention.

FIG. 3 is a circuit diagram of a gate driver circuit and a buck regulator control module 30 of a buck regulator module 33 according to an embodiment of the present disclosure. In this embodiment, given that the buck regulator module 30 includes the buck voltage regulators BVR1 and BVR2 (i.e., n=2). The buck regulator control module 33 includes the buck voltage regulator control circuits CTRL1 and CTRL2 respectively coupled to the gate drivers DRV1 and DRV2 of the buck voltage regulators BVR1 and BVR2. The buck voltage regulator control circuits CTRL1 and CTRL2 are configured to control a turned-on sequence of the high side switches HSW1 and HSW2 of the buck voltage regulators BVR1 and BVR2. In one embodiment, the buck regulator control module 33 is integrated in the buck regulator module 30; or, the buck voltage regulator control circuits CTRL1 and CTRL2 are respectively integrated in the buck voltage regulators BVR1 and BVR2.

The buck voltage regulators BVR1 and BVR2 are structurally identical, and take the buck voltage regulator BVR1 for example. The buck voltage regulator BVR1 includes a PWM controller PGEM1, a gate driver circuit DRV1, a high side switch HSW1, a low side switch LSW1, an output inductor L1, and an output capacitor C1. The PWM controller PGEM1 is coupled to the buck voltage regulator control circuit CTRL1, and configured to generate the PWM signal PWM1 according to the voltage enable signal V_EN1. The gate driver circuit DRV1 is coupled to the buck voltage regulator control circuit CTRL1, the high side switch HSW1, the low side switch LSW1 and the output inductor L1, and configured to turned-on the high side switch HSW1 or the low side switch LSW1 according to the PWM signal PWM1 to generate a charge current for charging the output capacitor C1, so as to convert the input voltage V_IN into the output voltage V_OUT1.

The buck voltage regulator control circuits CTRL1 and CTRL2 are structurally identical, and take the buck voltage regulator control circuit CTRL1 for example. The buck voltage regulator control circuit CTRL1 includes an inverter 311, an AND-gate 312, an OR-gate 313, and a switch SW1. The inverter 311 is coupled between the PWM controller PGEM2 and the AND-gate 312, and configured to invert the PWM signal PWM2 to generate an inverted PWM signal PWM2'. The AND-gate 312 is coupled to the PWM controller PGEM1, the inverter 311 and the OR-gate 313, and configured to generate a logic signal AND1 to the OR-gate 313 according to the voltage enable signal V_EN1 and the inverted PWM signal PWM2'. The OR-gate 313 is coupled to the PWM controller PGEM1, the AND-gate 312 and the switch SW1, and configured to generate the modulated enable signal PWM_EN1 to the switch SW1 according to the power good signal PWGD1 and the logic signal AND1. The switch SW1 is coupled between the PWM controller PGEM1, the gate driver circuit DRV1, the OR-gate 313, and configured to connect the PWM controller PGEM1 and the gate driver circuit DRV1 or disconnect the PWM controller PGEM1 from the gate driver circuit DRV1 according to the modulated enable signal PWM_EN1.

Operations of the buck voltage regulator BVR1 and the buck voltage regulator control circuit CTRL1 are described as follows, during the soft start phase, only when both the voltage enable signal V_EN1 and the inverted PWM signal PWM2' are at the high level (i.e., the PWM signal PWM2 is at the low level), the logic signal AND1 outputted by the AND-gate 312 is at the high level, and thus the modulated enable signal PWM_EN1 outputted by the OR-gate 313 is at the high level, so the switch SW1 connects the PWM controller PGEM1 and the gate driver circuit DRV1. Therefore, the gate driver circuit DRV1 turns on the high side switch HSW1 or the low side switch LSW1 according to the PWM signal PWM1 to generate the charge current I1 for charging the output capacitor C1, so as to convert the input voltage V_IN into the output voltage V_OUT1. Then, when the output voltage V_OUT1 has risen to a voltage level corresponding to the steady state, the PWM controller PGEM1 outputs the power good signal PWGD1 to notify voltage conversion is completed.

In other words, when the modulated enable signal PWM_EN1 is at the high level and the power good signal PWGD1 is at the low level, the buck voltage regulator BVR1 is in the soft start phase. During the soft start phase, the buck voltage regulator control circuit CTRL1 corresponding to the buck voltage regulator BVR1 take references to the PWM signal PWM2 of the buck voltage regulator BVR2 to determine whether to turn on its high side switch HSW1. For example, only when the PWM signal PWM2 is at the low level (or, the inverted PWM signal PWM2 ' is at the high level), the switch SW1 connects the PWM controller PGEM1 and the gate driver circuit DRV1 to turn on the high side switch HSW1. As a result, the buck voltage regulator control circuit CTRL1 can avoid the inrush current by avoiding the high side switch HSW1 and HSW2 from simultaneously turned on during the soft start phase.

Similarly, operations of the buck voltage regulator BVR2 and the buck voltage regulator control circuit CTRL2 are described as follows. During the soft start phase, only when both the voltage enable signal V_EN2 and the inverted PWM signal PWM1' are in the high level (i.e., the PWM signal PWM1 is at the low level), the logic signal AND2 outputted by the AND-gate 322 is at the high level, so the modulated enable signal PWM_EN2 outputted by the OR-gate 323 is at the high level, and the switch SW2 connects the PWM controller PGEM2 and the gate driver circuit DRV2. Therefore, the gate driver circuit DRV2 turns on the high side switch HSW2 or the low side switch LSW2 according to the PWM signal PWM2 to generate the charge current I2 for charging the output capacitor C2, so as to convert the input voltage V_IN into the output voltage V_OUT2. Then, when the output voltage V_OUT2 has risen to the voltage level corresponding to the steady state, the PWM controller PGEM2 outputs the power good signal PWGD2 to notify voltage conversion is completed.

In other words, when the modulated enable signal PWM_EN2 is at the high level and the power good signal PWGD2 is at the low level, the buck voltage regulator BVR2 is in the soft start phase. During the soft start phase, the buck voltage regulator control circuit CTRL2 corresponding to the buck voltage regulator BVR2 take references to the PWM signal PWM1 of the buck voltage regulator BVR1 to determine whether to turn on the high side switch HSW2. For example, only when the PWM signal PWM1 is at the low level (or, the inverted PWM signal PWM1' is at the high level), the switch SW2 connects the PWM controller PGEM2 and the gate driver circuit DRV2 to turn on the high side switch HSW2. As a result, the buck voltage regulator control circuit CTRL2 can avoid the inrush current by avoiding the high side switch HSW1 and HSW2 from simultaneously turned on during the soft start phase.

Therefore, by operations of the buck voltage regulator control circuits CTRL1 and CTRL2, the high side switches HSW1 and HSW2 of the buck voltage regulators BVR1 and BVR2 are avoided from simultaneously turned on during the soft start phase to avoid the inrush current and ensure the ripple voltage is constrained within the acceptable range (e.g., the low output capacitances C1 and C2 are kept high enough to avoid the inrush current) to ensure the operation of the output load of the direct current power supply system 2.

Figure 4:
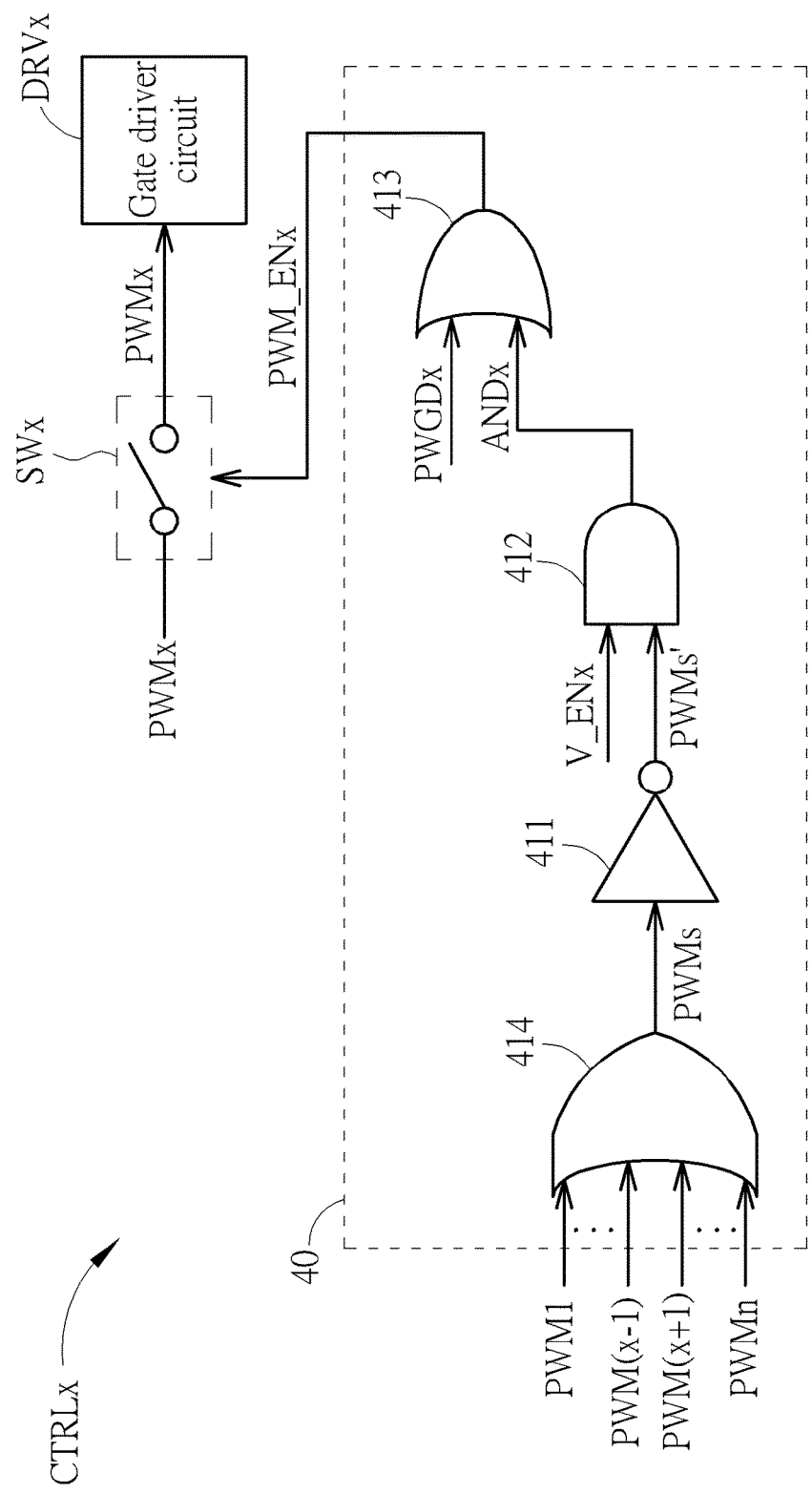
FIG. 4 is a circuit diagram of a buck voltage regulator control circuit and a gate driver according to an embodiment of the present invention.

FIG. 4 is a circuit diagram of a buck voltage regulator control circuit CTRLx and a gate driver DRVx according to an embodiment of the present disclosure. In this embodiment, given that the direct current power supply system includes n buck voltage regulators BVR1-BVRn, wherein the buck voltage regulator control circuit CTRLx corresponds to a buck voltage regulator BVRx (not shown in FIG. 4), and the buck voltage regulator BVRx is one of the n buck voltage regulators.

The buck voltage regulator control circuit CTRLx includes a logic circuit 40 and a switch SWx. The logic circuit 40 is configured to determine whether the buck voltage regulator BVRx is in the soft start phase. During the soft start phase, the logic circuit 40 takes reference to a PWM signal of another buck voltage regulator to generate a modulated enable signal PWM_ENx to the switch SWx to output a PWM signal PWMx. The gate driver circuit DRVx is coupled to the switch SWx, and configured to turn on its high side switch or keep its high side switch stay in the turned-off state according to the PWM signal PWMx. For example, only when the PWM signals of other buck voltage regulators are at the low level, the logic circuit 40 controls the switch SWx to output the PWM signal PWMx to turn on its high side switch; on the contrary, if there is any PWM signal of any buck voltage regulator is at the high level, the logic circuit 40 controls the switch SWx not to output the PWM signal PWMx to keep its high side switch stay in the turned-off state. As a result, during the soft start phase, the buck voltage regulator control circuit CTRLx avoids its and other high side switches from simultaneously turned on to avoid the inrush current.

The logic circuit 40 includes an inverter 411, an AND-gate 412, a first OR-gate 413, and a second OR-gate 414. The inverter 411 is coupled between the second OR-gate 414 and the AND-gate 412, and configured to generate an inverted logic signal PWMs' to the AND-gate 412. The AND-gate 412 is coupled to the PWM controller, the inverter 411 and the OR-gate 413 of the buck voltage regulator control circuit CTRLx, and configured to generate a logic signal ANDx to the OR-gate 413 according to a voltage enable signal V_ENx and an inverted logic signal PWMs' corresponding to the buck voltage regulator BVRx. The OR-gate 413 is coupled to the PWM controller, the AND-gate 412 and the switch SWx of the buck voltage regulator BVRx, and configured to generate the modulated enable signal PWM_ENx to the switch SWx according to a power good signal PWGDx and the logic signal ANDx corresponding to the buck voltage regulator BVRx. The switch SWx is configured to connect the PWM controller and the gate driver circuit or disconnect the PWM controller from the gate driver circuit according to the modulated enable signal PWM_ENx. The second OR-gate 414 is coupled between the buck voltage regulators BVR1-BVR (x−), BVR(x+1)-BVRn and inverter 411, and configured to generate a logic signal PWMs according to the PWM signals PWM1-PWM (x−1) and PWM (x+1)-PWMn of the buck voltage regulators BVR1-BVR(x−1) and BVR(x+1)-BVRn. The switch SWx is coupled between the logic circuit 40, the PWM controller and the gate driver circuit corresponding to the buck voltage regulator BVRx, and configured to connect the PWM controller and the gate driver circuit corresponding to the buck voltage regulator BVRx or disconnect the PWM controller from the gate driver circuit corresponding to the buck voltage regulator BVRx according to logic circuit 40 outputted by modulated enable signal PWM_ENx.

Noticeably, the buck voltage regulator control circuit CTRL1 in FIG. 3, the direct current power supply system is given to include two buck voltage regulators, and determining whether another PWM signal of another buck voltage regulator is at the low level is enough; in comparison, the buck voltage regulator control circuit CTRLx further includes the second OR-gate 414 configured to simultaneously determine whether the multiple PWM signals are at the low level.

When the modulated enable signal PWM_ENx is at the high level and the power good signal PWGDx is at the low level, the buck voltage regulator BVRx is in the soft start phase. During the soft start phase, the control circuit CTRLx may take references to the other PWM signals PWM1-PWM (x−1) and PWM (x+1)-PWMn of the buck voltage regulators BVR1-BVR(x−) and BVR(x+1)-BVRn to determine whether to turn on its high side switch HSWx. For example, only when the PWM signals PWM1-PWM (x−1) and PWM (x+1)-PWMn are at the low level, the switch SWx connects the PWM controller and the gate driver circuit to turn on the high side switch HSWx. As a result, during the soft start phase, the control circuit CTRLx may avoid the high side switches HSW1-HSWn from simultaneously turned on to avoid the inrush current.

To sum up, when the direct current power supply system is in the soft start phase, the present invention avoids all the high side switches of the direct current power supply system from simultaneously being turned on by controlling the enable sequence of the PWM signals of each of buck voltage regulators to avoid the over inrush current. For the direct current power supply system, since the inrush current is effectively constrained, there is no need to increase the rated maximum current and the trigger level of the over current protection provided by the direct current power supply system. Likewise, there is no need to reduce output capacitances of the buck voltage regulators for reducing the inrush current to ensure a ripple voltage of an output voltage is suppressed within a rated peak-to-peak voltage range and a stability of an output load (e.g., a computer system).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A single-input multi-output direct current (DC) power supply system configured to convert a DC input voltage into a plurality of DC output voltages, the power supply system comprising:
   a buck regulator module comprising a first buck voltage regulator and a second buck voltage regulator, wherein the first buck voltage regulator is configured to generate a first PWM signal according to a first voltage enable signal, and convert the DC input voltage into a first DC output voltage according to the first PWM signal and a first modulated enable signal; and
   a buck regulator control module coupled to the buck regulator module, the buck regular control module comprising:
      a first buck voltage regulator control circuit coupled to the first buck voltage regulator and the second buck voltage regulator, and configured to generate the first modulated enable signal to the first buck voltage regulator according to the first voltage enable signal, the first PWM signal, a first power good signal generated by the first buck voltage regulator, and a second PWM signal generated by the second buck voltage regulator;
   wherein during a soft start phase of the first buck voltage regulator and when the second PWM signal is at a low level, the buck voltage regulator control circuit controls a first high side switch of the first buck voltage regulator to switch to a turned-on state from a turned-off state and a second high side switch of a second buck voltage regulator to stay in the turned-off state.

2. The power supply system of claim 1, wherein the first buck voltage regulator control circuit comprises:
   a switch coupled to the first buck voltage regulator, and configured to connect a first PWM controller of the first buck voltage regulator to a gate driver circuit or disconnect the first PWM controller of the first buck voltage regulator from the gate driver circuit according to the first modulated enable signal; and
   a logic circuit coupled to the switch and the first buck voltage regulator, and configured to generate the first modulated enable signal to the switch according to the first voltage enable signal, the first PWM signal, the first power good signal and the second PWM signal.

3. The power supply system of claim 2, wherein the logic circuit comprises:
   an inverter configured to generate an inverted first logic signal according to a first logic signal;
   an AND-gate coupled to the inverter and the first PWM controller of the first buck voltage regulator, and configured to generate a second logic signal according to the first voltage enable signal and the inverted first logic signal; and
   a first OR-gate coupled to the first PWM controller, the AND-gate and the switch, and configured to generate the first modulated enable signal to the switch according to the first power good signal and the second logic signal.

4. The power supply system of claim 3, wherein the inverter is coupled to a second PWM controller of the second buck voltage regulator, and the first logic signal is the second PWM signal.

5. The power supply system of claim 3, wherein the buck regulator module comprises a plurality of second buck voltage regulators, and the logic circuit further comprises:
a second OR-gate coupled to the plurality of buck voltage regulator and the inverter, and configured to generate the first logic signal to the inverter according to a plurality of second PWM signals generated by the plurality of second buck voltage regulators.

6. The power supply system of claim 1, wherein the second buck voltage regulator is configured to generate the second PWM signal according to a second voltage enable signal, and convert the DC input voltage into a second DC output voltage according to the second PWM signal and a second modulated enable signal.

7. The power supply system of claim 6, wherein the buck regulator control module comprises:
a second buck voltage regulator control circuit coupled to the first buck voltage regulator and the second buck voltage regulator, and configured to generate a second modulated enable signal to the second buck voltage regulator according to the second voltage enable signal, the second PWM signal, a second power good signal generated by the second buck voltage regulator and the first PWM signal generated by the first buck voltage regulator;
wherein when the second PWM signal is at the low level, the first modulated enable signal controls a first high side switch of the first buck voltage regulator to switch from the turned-off state to the turned-on state, and a plurality of high side switches of the second buck voltage regulator stay in the turned-off state.

8. The power supply system of claim 6, further comprising:
an AC (alternating current)-to-DC voltage converter coupled to the buck regulator module and the buck regulator control module, and configured to convert an AC voltage into the DC input voltage to the buck regulator module; and
a power control circuit coupled to the AC-to-DC voltage converter, and configured to respectively generate the first voltage enable signal and the second voltage enable signal to the first buck voltage regulator control circuit and the second buck voltage regulator control circuit according to the DC input voltage.

9. The power supply system of claim 1, wherein when the first voltage enable signal is at a high level and the first power good signal is at a low level, the first buck voltage regulator control circuit operates in the soft start phase; and when the first voltage enable signal is at the high level and the first power good signal is at the low level, the first buck voltage regulator control circuit operates in a steady state.

10. A first buck voltage regulator control circuit for a single-input multi-output DC power supply system, the first buck voltage regulator control circuit comprising:
a switch coupled to a first buck voltage regulator of the single-input multi-output DC power supply system, and configured to connect a first PWM controller of the first buck voltage regulator and a gate driver circuit or disconnect the first PWM controller of the first buck voltage regulator from the gate driver circuit according to a first modulated enable signal; and
a logic circuit coupled to the switch and the first buck voltage regulator, and configured to generate the first modulated enable signal to the switch according to a first voltage enable signal, a first PWM signal generated by the first PWM controller, a first power good signal generated by the first PWM controller and a second PWM signal generated by a second buck voltage regulator of the single-input multi-output DC power supply system;
wherein during a soft start phase of the first buck voltage regulator and when the second PWM signal is at a low level, the buck voltage regulator control circuit controls a first high side switch of the first buck voltage regulator to switch to a turned-on state from a turned-off state and a second high side switch of a second buck voltage regulator to stay in the turned-off state.

11. The control circuit of claim 10, wherein the single-input multi-output DC power supply system comprises:
a buck regulator module comprising a first buck voltage regulator and a second buck voltage regulator, wherein the first buck voltage regulator is configured to generate a first PWM signal according to a first voltage enable signal, and convert the DC input voltage into a first DC output voltage according to the first PWM signal and a first modulated enable signal.

12. The control circuit of claim 10, wherein the logic circuit comprises:
an inverter configured to generate an inverted first logic signal according to a first logic signal;
an AND-gate coupled to the inverter and the first PWM controller of the first buck voltage regulator, and configured to generate a second logic signal according to the first voltage enable signal and the inverted first logic signal; and
a first OR-gate coupled to the first PWM controller, the AND-gate and the switch, and configured to generate the first modulated enable signal to the switch according to the first power good signal and the second logic signal.

13. The control circuit of claim 12, wherein the single-input multi-output DC power supply system comprises a buck regulator control module, coupled to the buck regulator module, the buck regulator module comprises the first buck voltage regulator control circuit and a second buck voltage regulator control circuit, the inverter is coupled to a second PWM controller of the second buck voltage regulator, and the first logic signal is the second PWM signal.

14. The control circuit of claim 12, wherein the buck regulator module comprises a plurality of second buck voltage regulators, and the logic circuit further comprises:
a second OR-gate coupled to the plurality of buck voltage regulator and the inverter, and configured to generate the first logic signal to the inverter according to a plurality of second PWM signals generated by the plurality of second buck voltage regulators.

15. The control circuit of claim 10, wherein the second buck voltage regulator is configured to generate the second PWM signal according to a second voltage enable signal, and convert the DC input voltage into a second DC output voltage according to the second PWM signal and a second modulated enable signal.

16. The control circuit of claim 15, wherein the buck regulator control module comprises:
a second buck voltage regulator control circuit coupled to the first buck voltage regulator and the second buck voltage regulator, and configured to generate a second modulated enable signal to the second buck voltage regulator according to the second voltage enable signal, the second PWM signal, a second power good signal generated by the second buck voltage regulator and the first PWM signal generated by the first buck voltage regulator;

wherein when the second PWM signal is at the low level, the first modulated enable signal controls a first high side switch of the first buck voltage regulator to switch from the turned-off state to the turned-on state, and a plurality of high side switches of the second buck voltage regulator stay in the turned-off state.

17. The control circuit of claim 15, wherein the single-input multi-output DC power supply system further comprises:

an AC-to-DC voltage converter coupled to the buck regulator module and the buck regulator control module, and configured to convert an AC voltage into the DC input voltage to the buck regulator module; and a power control circuit coupled to the AC-to-DC voltage converter, and configured to respectively generate the first voltage enable signal and the second voltage enable signal to the first buck voltage regulator control circuit and the second buck voltage regulator control circuit according to the DC input voltage.

18. The control circuit of claim 10, wherein when the first voltage enable signal is at a high level and the first power good signal is at a low level, the first buck voltage regulator control circuit operates in the soft start phase; and when the first voltage enable signal is at the high level and the first power good signal is at the low level, the first buck voltage regulator control circuit operates in a steady state.

* * * * *

UNITED STATES PATENT AND TRADEMARK OFFICE
CERTIFICATE OF CORRECTION

PATENT NO. : 10,090,756 B1
APPLICATION NO. : 15/942563
DATED : October 2, 2018
INVENTOR(S) : Meng-Ru Tsai et al.

Page 1 of 1

It is certified that error appears in the above-identified patent and that said Letters Patent is hereby corrected as shown below:

On the Title Page

Item (73), correct the name of the assignee from "Winstron Corporation" to --Wistron Corporation--.

Signed and Sealed this
Twentieth Day of November, 2018

Andrei Iancu
*Director of the United States Patent and Trademark Office*